United States Patent [19]

Willis

[11] Patent Number: 4,803,723
[45] Date of Patent: Feb. 7, 1989

[54] TELEPHONE

[75] Inventor: Gordon Willis, St Albans, Great Britain

[73] Assignee: STC PLC, London, United Kingdom

[21] Appl. No.: 109,107

[22] Filed: Oct. 16, 1987

[30] Foreign Application Priority Data

Dec. 24, 1986 [GB] United Kingdom ............... 86 30895

[51] Int. Cl.⁴ .............................................. H04M 1/08
[52] U.S. Cl. ..................................... 379/424; 379/433
[58] Field of Search ............... 379/422, 424, 426, 427, 379/433, 436, 437, 448; D14/52, 53, 56, 60, 61, 65

[56] References Cited

U.S. PATENT DOCUMENTS

D. 283,614  4/1986  Somaschini .......................... D14/52
3,073,911  1/1963  Mattke et al. ......................... 379/424

FOREIGN PATENT DOCUMENTS 0160760  8/1985  Japan .................................... D14/53

Primary Examiner—Stewart J. Levy
Assistant Examiner—Brent Bonner
Attorney, Agent, or Firm—Lee & Smith

[57] ABSTRACT

A telephone instrument has a rectangular recess (3) along one side of the body which receives the handset. The handset has a recess which fits over a locating member (2) when on-hook. The hook switch contacts (6) are controlled by a pivoted member (4), which acts on the end of a plunger (7) to control the hook-switch contacts. The plunger (7) is spring-urged to its off-hook condition, i.e. when the handset is not in the recess.

4 Claims, 2 Drawing Sheets

TELEPHONE

The present invention relates to a telephone subscriber's instrument, and especially to the hook-switch arrangements for use therein.

BACKGROUND AND SUMMARY OF THE INVENTION

One of the modern trends in telephone instrument development is towards smaller instruments, and to instruments the weight of which is less than that of conventional telephone instruments. This has introduced the difficulty that the relatively light handset now used may have difficulty in operating the hook-switch arrangements. The present invention seeks to provide a telephone instrument in which such difficulties are minimized or even overcome.

In one aspect the invention provides a telephone subscriber's instrument, which has an instrument body with a recess of generally rectangular cross-section in the instrument body, which recess extends along a side of said instrument body, and a handset a substantial part of the length of which is of generally rectangular cross-section so proportioned that the handset fits smoothly into the recess.

Such an instrument enables a hook-switch operating arrangement to be provided which extends into the recess in such a way as to be readily operable when the handset is fitted into the recess, this being the condition which corresponds to the so-called on-hook condition.

According to another aspect of the invention there is provided a telephone subscriber's instrument, which includes an instrument body with a recess of generally rectangular cross-section in the instrument body, a handset a substantial part of the length of which is of generally rectangular cross-section so proportioned that the handset fits smoothly into the recess, hook-switch contact means in the instrument body and adjacent to said recess, and a plunger associated with said hook-switch contact means such that when the handset is fitted into the recess the plunger is caused to move the contact means from the off hook to the on hook condition and that when the handset is removed from the recess the plunger is caused to move the contact means from the on hook to the off hook condition.

DESCRIPTION OF THE PREFERRED EMBODIMENT

Figure 1:
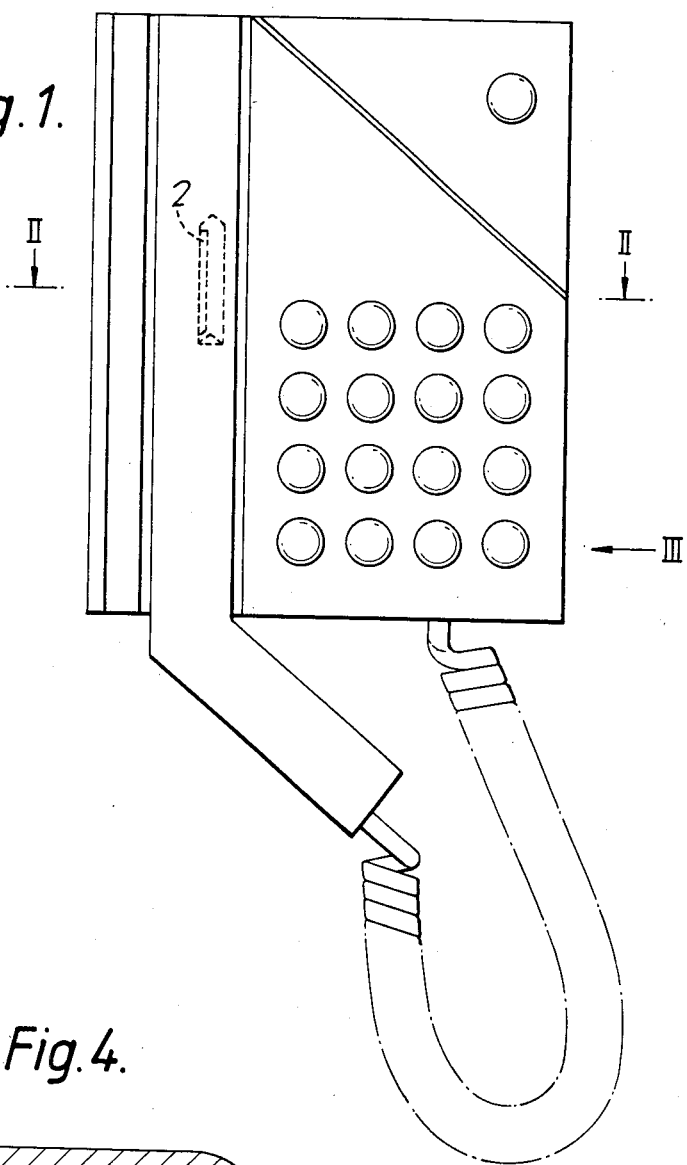
FIG. 1 is a top-plan view of a telephone embodying the invention.
Figure 4:
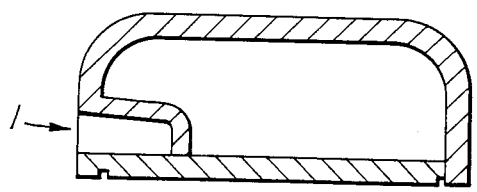
FIG. 4 is a cross-section, on an enlarged scale, of the handset at the point at which the dashed line II—II, FIG. 1, crosses it.
Figure 2:
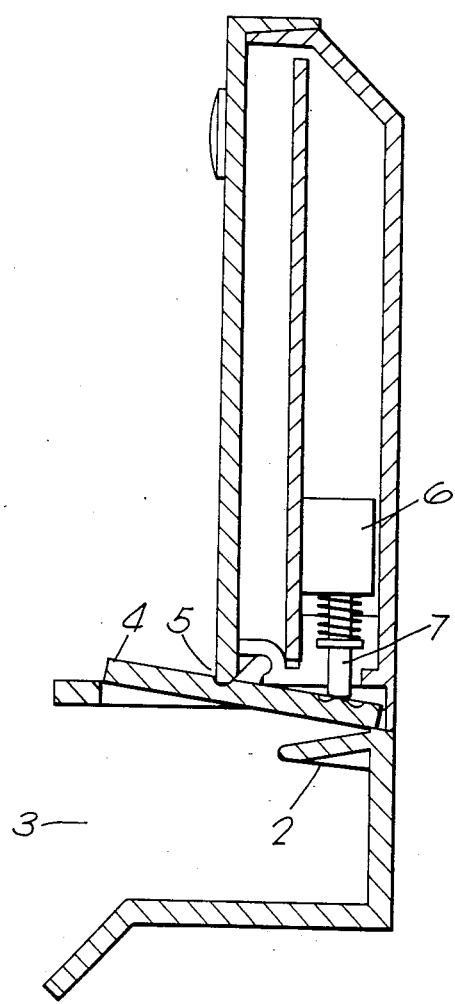
FIG. 2 is a section along the line II—II of FIG. 1, looking in the direction of the arrows.
Figure 3:
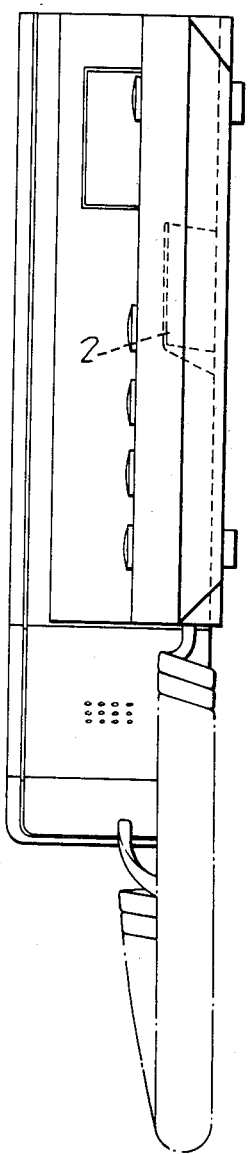
FIG. 3 is a side view of the telephone, looking in the direction of the arrow III, FIG. 1.

At one side of the handset recess, FIG. 2, there is a flat plate-like member 4 located in an upright side with respect to the bottom of the recess, pivoted near its mid-point at 5 to part of the upper surface of the instrument body. The hook switch contacts are in a small box 6, which may house one or more micro-switches to perform the hook-switch function. The hook-switch contacts are controlled by a plunger 7 which bears on the lower end of the member 4 and urges it clockwise to the position shown in FIG. 2.

When the handset is on-hooked, its recess 1 fits over the member 2 to locate it in the recess 3. The side of the handset then acts on the lower end of the member 4 to rotate it, so that the plunger 7 is pushed rightwards against the urgence of its spring. This sets the hook-switch contacts to the on-hook condition.

When the instrument is off-hooked, the removal of the handset from the recess 3 allows the plunger 7 to move leftwards under spring urgence to set the hook-switch to its off-hook state. This also, of course, sets the member 4 to the condition shown in FIG. 2.

I claim:

1. A telephone subscriber's instrument, which includes;
   an instrument body with a recess of generally rectangular cross-section in the instrument body;
   a handset a substantial part of the length of which is of generally rectangular cross-section and so proportioned that the handset fits smoothly into the recess;
   an upstanding locating member in the bottom of the recess and a blind hole in the handset which fits over the upstanding locating member when the handset is in the recess, so as to locate said handset in the recess;
   hook-switch contact means within the instrument body and adjacent to one side of the recess; and
   a pivotted member located in an upright side with respect to the bottom of the recess, said pivotted member mounted in the instrument body with a portion of said pivotted member extending into said recess;
   wherein:
   when the handset is fitted into said recess with its blind hole over said upstanding member the side of the handset rocks said pivotted member about its pivot point in such a direction as to operate said contact means against spring urgence into the on hook condition of said contact means; and
   wherein when the handset is removed from said recess said spring urgence drives the contact means to its off-hook condition and causes the pivotted member to pivot about its said pivot point to its off-hook condition.

2. An instrument as claimed in claim 1, wherein the hook switch contact means is a micro-switch with an operating plunger spring urged to its off-hook condition by internal spring means of the micro-switch, and wherein said plunger acts on said pivotted member to pivot it to its off-hook condition when the handset is removed from its recess, such that the internal spring means of the micro-switch provides said spring urgence.

3. An instrument as claimed in claim 1, in which the instrument body is generally rectangular with the handset recess extending along one of its sides.

4. An instrument as claimed in claim 1, in which the instrument has a push-button set.

* * * * *